3,591,447
LOW DENSITY CORK-ASBESTOS FELT AND PROCESS OF PRODUCING THE SAME
Daniel L. Juhl, Lancaster, Pa., assignor to Raybestos-Manhattan, Inc., Manheim, Pa.
No Drawing. Filed Jan. 31, 1967, Ser. No. 612,812
Int. Cl. B32b 19/08
U.S. Cl. 161—155                                    17 Claims

ABSTRACT OF THE DISCLOSURE

A low density cork-filled asbestos felt composed of first and second webs of dry carded spinning grade asbestos fibers, between which there is an intermediate discontinuous layer of granulated cork particles which, prior to being combined with the webs of asbestos fibers, are coated with from 1 to 10 percent of a thermosetting resin. In the felt, fibers in the opposing surfaces of the first and the second webs extend through the interstices in the discontinuous layer of granulated cork particles and are entangled with fibers from the opposing web. The cork-filled asbestos felt contains from 20 to 50 percent, by weight, of a thermosetting resin. A process for preparing the cork-filled asbestos felt is also described.

---

This invention relates to a reinforcing material for providing strong lightweight reinforced plastic bodies, said material being prepared by sandwiching a layer of thermosetting resin-coated granular cork particles between thermo-setting resin-impregnated dry carded webs of spinning grade asbestos fibers.

The increased payload requirements of the Aerospace Industry have created a demand for reinforced plastics which are lighter in weight yet possess the necessary strength for use in rockets and missiles. Inorganic fibrous materials, such as asbestos and glass fibers, have been used as reinforcing materials for plastics. Unfortunately, these reinforcing materials have a relatively high specific gravity and reinforced plastics containing them, although having the requisite physical strength, are relatively heavy, thereby restricting the payload of rockets and missiles in which they are used.

In order to reduce specific gravity it has been proposed to use as a lightweight reinforcing material, a web of asbestos containing cork particles. These webs were impregnated with a thermosetting resin and laminates prepared therefrom. However, the physical properties of such laminates were much lower than desired.

An object of this invention is to provide a low density cork-asbestos reinforcing material particularly suitable for producing strong reinforced plastic bodies of reduced specific gravity.

Another object is to provide an improved method for producing a low density thermosetting resin-impregnated cork-asbestos felt reinforcing material for plastics.

Still another object is the provision of high strength, low specific gravity laminate from which rockets and missiles of greater payload capacity can be produced.

These and other objects of this invention will become further apparent from the following description and appended claims.

According to this invention there is provided a novel process for producing a low density cork-filled asbestos felt particularly suitable for use as reinforcing material for molded plastic bodies which comprises forming a first web of dry carded spinning grade asbestos fibers, distributing on said first web a substantially uniform layer of granulated cork particles, said cork particles being coated with from about 1 to about 10 percent, by weight, of a thermosetting resin, based on weight of cork, combining a second web of dry carded spinning grade asbestos fibers with said first web with said layer of resin-coated cork particles lying between said webs, and impregnating the resulting composite felt with from about 20 to about 50 percent, by weight, of a thermosetting resin, based on weight of asbestos fibers.

It was discovered that by sandwiching resin-coated granular cork particles between webs of dry carded spinning grade asbestos fibers there resulted a reinforcing material for plastic bodies which not only substantially reduced the specific gravity of such plastic bodies, but provided them with the desired physical strength.

Thus, this invention provides reinforced plastic compositions of reduced specific gravity and adequate strength, which can be formed into parts for rockets and missiles to provide them with a greater payload capacity.

In preparing the low density cork-filled asbestos felt reinforcing material of this invention, two or more webs of dry carded spinning grade asbestos webs are formed in any suitable manner. A particularly satisfactory method for forming such webs is described and illustrated in U.S. Pat. No. 2,943,010 issued in the names of Eugene P. Stefl and Thomas D. Coleman on June 28, 1960. According to the procedure described in that patent, dry carded asbestos fibers are taken from a main card cylinder by fancies and are transferred to doffers to form a web. One or more webs can be formed in the above manner and combined to obtain a single web of the desired thickness. A suitable thickness of the asbestos webs which are combined with cork particles to form the cork-asbestos felt is from about 0.005" to 0.015", a thickness of 0.01" being preferred.

An important feature of this invention is the use of dry carded spinning grade asbestos fibers to form the asbestos webs between which the granulated cork particles are sandwiched. Although there is some orientation of the carded asbestos fibers due to the carding action, there is predominately a random disposition of the fibers in the webs, and this random disposition plays an important part in the intimate interlocking of asbestos fibers with one another when the webs are plied up with cork particles therebetween.

Examples of the types of asbestos fibers which are suitable for use in the plastic reinforcing materials of the present invention are chrysotile, crocidolite and amosite. The length of the asbestos fibers employed may range from about ⅛" to 1½" or larger, the preferred average length being about ⅝".

According to this invention, the reinforcing material may be composed solely of asbestos fibers, cork particles and resin. This invention also contemplates the use of webs comprising a mixture of carded asbestos fibers and glass fibers. The glass fibers should have a diameter similar to that of the asbestos fibers, i.e., from about $6 \times 10^{-5}$ to about $8 \times 10^{-5}$ in., and may range in length from 1½" to 3", the preferred length being 1½". In order to aid in the carding operation a small amount, up to 10% by weight of organic fibers may be employed. Such carrier fibers may be composed of rayon, cotton, nylon, Dacron, Orlon, etc. The diameter and length of such fibers preferably is similar to those of the glass fibers, referred to above.

Where carrier fibers are employed, they may be blended with the asbestos fibers during the carding operation. The carding operation involves passage through a breaker card and a finisher card, and the blending of the fibers may be preformed during the initial pass through the breaker card, the final mat consisting of a combination of the fibers as it leaves the finishing card.

The cork particles employed in preparing the felts of this invention are of granular size, and preferably substantially all of said particles have a particle size such as to pass through a U.S. Standard 14 mesh screen, but be retained on a 20 mesh screen or sieve.

As stated above, these granular cork particles are coated with a thermosetting resin prior to being combined with the asbestos webs. The resin may be coated on the particles in any suitable manner. A particularly suitable method for applying resin to the cork particles is to form a solution of the resin in a suitable solvent for the resin, place the cork particles and resin solution in a mixer, such as a Warner-Pfleider mixer, mix the cork particles and resin solution together to obtain a relatively uniform coating of resin on the particles, and then evaporate the solvent to provide a residual coating of resin on the particles.

The amount of resin applied to the cork particles can be varied. For most uses, sufficient resin should be employed to provide the cork particles with a resin coating comprising from about 1 to about 10 percent, by weight, based on weight of cork particles. Preferably, the resin-coated cork particles comprise from about 4 to 5 percent of resin.

The resin-coated cork particles are then applied as a layer to one surface of a web of dry carded spinning grade asbestos fibers. The cork particles should be applied to the asbestos web as a substantially uniform layer. This may be accomplished by passing the asbestos web under any suitable device for distributing granular material, such as a hopper which can be provided with means for vibrating the contents.

The quantity of resin-coated particles applied should be such that the weight thereof in the final felt is from about 10 to about 25 percent, based onthe combined weight of resin-coated cork particles and asbestos fibers, 18 percent resin-coated cork particles being preferred.

Employing the above-stated amount of cork particles, the layer of cork particles is discontinuous so that areas of the felt upon which they are deposited are visible. Thus, when a second web of dry carded spinning grade asbestos fibers is applied to the first over the layer of cork particles and the webs are combined under modest pressure, the fibers of the respective webs become entangled, thereby increasing the strength of the resulting cork-asbestos felt.

The first and second asbestos webs with the resin-coated cork particles therebetween may be combined by passing the webs between pressure rolls. In passing between such rolls, modest pressure, e.g., a pressure of from about 5 to about 15 p.s.i., and preferably from about 8 to about 13 p.s.i. may be applied to interlock the fibers of the respective webs. If a pressure greater than about 15 p.s.i. is used, the cork particles may become compressed with an undesirable increase in the density of the resulting composite felt.

The composite cork-asbestos felt obtained in the manner previously described is impregnated with a thermosetting resin, preferably of the same type or composition as that employed to coat the cork particles. There are presently available a wide variety of such resins and undoubtedly other suitable resins will be developed in the future. Those thermosetting resins which have been found to be most satisfactory for use in this invention are phenolic, unsaturated polyester and epoxy resins.

In order to provide reinforced plastic bodies having the desired physical properties, the proportion of resin to asbestos fibers should be controlled so that the solvent-free cork-asbestos felt will contain between about 20 and about 50 percent, and preferably between about 30 and 40 percent, of resin, based on weight of asbestos fibers. In determining the amount of resin, the relatively small quantity of resin with which the cork particles are coated prior to being combined with the asbestos webs is not to be considered, since this resin is accounted for in the above-stated proportion of resin-coated cork particles to asbestos fibers. If more than about 50 percent of resin is employed, strength properties may be considerably reduced.

The resins should contain the usual catalysts, accelerators, stabilizers, etc.

The resins may be applied to the composite cork-asbestos felt in the form of an impregnating solution of resin in an organic solvent. The solvent ordinarily will be a volatile solvent which can be removed at temperatures below about 250° F. Examples of usable solvents include methyl, ethyl and butyl alcohol, benzene, toluene, acetone, methyl ethyl ketone, methyl isobutyl ketone, ethylene dichloride, carbon tetrachloride, ethyl acetate and other volatile organic solvents of comparable solvent power and evaporation rate. The amount of solvent employed in forming the impregnating solutions will depend primarily upon the viscosity of the resin used with the solvent. Generally the impregnating solution will comprise from about 50 to about 80 percent, by weight of solvent.

The impregnation of the cork-asbestos felt with thermosetting resin can be carried out in any suitable type of equipment. Impregnation tanks, padding units, doctor-blade units, roller coating units, spraying devices or the like may be employed. Regardless of the procedure used, the conditions should be such as to result in a resin impregnated felt containing the above-stated amounts of resin.

Following impregnation, the impregnated felt is subjected to conditions to remove the solvent and partially transform the resin to the B-stage. Ovens or tunnel driers heated by steam, infra-red or induction heating may be employed for this purpose.

In using the cork-asbestos felt of this invention, a suitable number of plies thereof are superimposed and heated under pressure to bond the plies into a unitary structure. Generally pressures from about 50 to about 200 p.s.i. and temperatures from about 260° to about 330° F. may be used for this purpose. If pressures exceeding 200 p.s.i. by a substantial amount are used, the cork particles may be crushed, resulting in plastic bodies having a higher specific gravity than desired. Also too high temperatures may decompose the cork.

Using the above-described laminating pressures and temperatures, plastic articles having a specific gravity of from about 0.9 to about 1.4 can be obtained. This is to be compared with a specific gravity of about 1.8 where the reinforcing material comprises asbestos fibers alone, the resin content being the same in each case.

The following examples are illustrative of the invention, but are not intended as limiting the scope in any way.

EXAMPLE I

Granulated cork particles were coated with a solution of a two-stage phenol formaldehyde resin. After removal of solvent the cork particles comprised about 4.2 percent of resin, based on weight of cork.

The resin-coated cork particles were applied as a layer to a web of dry carded spinning grade asbestos fibers. A second web of dry carded spinning grade asbestos fibers was combined with the first web with the cork particles lying between the webs. The resin-coated cork particles comprised 12 percent, by weight, based on weight of asbestos fibers in the resulting composite felt.

The resulting composite felt was impregnated with 37.5 percent by weight of the same two-stage thermosetting resin employed to coat the cork particles.

A lightweight reinforced plastic body 12" x 12" x ¼" was prepared by superimposing a plurality of layers of the composite felt, prepared as above, and heating the combined layers at a temperature of 325° F. and a pressure of 75 p.s.i.

EXAMPLE II

Example I was repeated, with the exception that the cork particles were coated with 4.7 percent of resin, the resin-coated cork particles comprised 18 percent of the composite felt, and the felt was impregnated with 32.5 percent of thermosetting resin.

A 12" x 12" x ¼" reinforced plastic body was prepared by superimposing a plurality of layers of the composite felt, prepared as above, and heating the combined layers at a temperature of 290° F. and a pressure of 200 p.s.i.

Physical properties for the plastic body are set forth in Table I, below.

EXAMPLE III

The procedure of Example II was repeated, except that the cork particles were not coated with resin prior to being combined with the dry carded webs of spinning grade asbestos fibers in forming the thermosetting resin impregnated composite felt.

Physical properties for the plastic body are set forth in Table I, below.

TABLE I

| Example | II | III |
| --- | --- | --- |
| Flexural strength (p.s.i.) | 31,780 | 23,000 |
| Flexural modulus | $2.27 \times 10^6$ | $1.95 \times 10^6$ |
| Tensile strength (p.s.i.) | 23,820 | 18,000 |
| Tensile modulus | $2.84 \times 10^6$ | $2.34 \times 10^6$ |

The data in Table I show the substantially improved strength properties of laminates of relatively low specific gravity which can be obtained according to the present invention.

What is claimed is:

1. A process for producing a low density cork-filled asbestos felt particularly suitable for use as reinforcing material for molded plastic bodies which comprises forming a first web of dry carded spinning grade asbestos fibers, distributing on said first web a substantially uniform layer of granulated cork particles, said cork particles being coated with from about 1 to about 10 percent, by weight, of a thermosetting resin, based on weight of cork, combining a second web of dry carded spinning grade asbestos fibers with said first web with said layer of resin-coated cork particles lying between said webs, and impregnating the resulting composite felt with from about 20 to about 50 percent, by weight, of a thermosetting resin, based on weight of asbestos fibers.

2. A process according to claim 1 in which said cork particles have a particle size such that substantially all of said particles pass through a 14 mesh sieve but are retained on a 20 mesh sieve.

3. A process according to claim 2 in which said resin-impregnated cork particles comprise from about 10 to about 25 percent, by weight, of said felt, based on the combined weight of said resin-coated cork particles and said asbestos fibers.

4. A process according to claim 3 in which said resin-impregnated cork particles comprise about 18 percent by weight of said felt, based on the combined weight of said resin-coated particles and said asbestos fibers.

5. A process according to claim 1 in which said resin comprises a two-stage thermosetting resin which is advanced to the B-stage after impregnation of the felt.

6. A process according to claim 5 in which said resin comprises a phenolic resin.

7. A process for producing a light weight reinforced plastic body which comprises laminating under a pressure in the range between about 50 and about 200 p.s.i. and a temperature in the range between about 260° and about 330° F., a plurality of superimposed layers of low density cork-filled asbestos felt, said felt having been prepared by forming a first dry carded web of spinning grade asbestos fibers, distributing on said first web a substantially uniform layer of granulated cork particles, said cork particles being coated with from about 1 to about 10 percent, by weight, of a thermosetting resin, based on weight of cork, combining a second web of dry carded spinning grade asbestos fibers with said first web with said layer of resin-coated cork particles lying between said webs, and impregnating the resulting composite felt with from about 20 to about 50 percent, by weight, of a thermosetting resin, based on weight of asbestos fibers.

8. A process according to claim 7 in which said cork particles have a particle size such that substantially all of said particles pass through a 14 mesh sieve but are retained on a 20 mesh sieve.

9. A process according to claim 8 in which said resin-impregnated cork particles comprise from about 10 to about 25 percent, by weight, of said felt, based on the combined weight of said resin-coated cork particles and said asbestos fibers.

10. A process according to claim 9 in which said resin-impregnated cork particles comprise about 18 percent, by weight of said felt, based on the combined weight of said resin-coated particles and said asbestos fibers.

11. A process according to claim 7 in which said resin comprises a phenolic resin.

12. A low density cork-filled asbestos felt comprising opposing first and second webs comprising dry carded spinning grade asbestos fibers, an intermediate, substantially uniform discontinuous layer of granulated cork particles between said webs, said cork particles having been coated with from about 1 to about 10 percent, by weight of cork particles, of a thermosetting resin prior to being combined with said webs, fibers in the opposing surfaces of said webs extending through the interstices in said layer of cork particles, and being entangled with fibers of the opposing web, and said felt containing from about 20 to about 50 percent, by weight of asbestos fibers, of a thermosetting resin.

13. A low density cork-filled asbestos felt according to claim 12 wherein the granulated cork particles have a particle size such that substantially all of the particles pass through a 14 mesh sive and are retained on a 20 mesh sieve.

14. A low density cork-filled asbestos felt according to claim 12 wherein the resin-coated cork particles comprise from about 10 to about 25 percent, by weight, of the cork-filled asbestos felt, based on the combined weight of the resin-coated cork particles and asbestos fibers.

15. A low density cork-filled asbestos felt according to claim 14 wherein the resin-coated cork particles comprise about 18 percent, by weight, of the cork-filled asbestos felt, based on the combined weight of resin-coated cork particles and asbestos fibers.

16. A low density cork-filled asbestos felt according to claim 12 wherein the granulated cork particles are coated with from about 4 to about 5 percent, by weight, of a thermosetting resin, based on the weight of the cork particles.

17. A low density cork-filled asbestos felt according to claim 12 wherein the cork-filled asbestos felt contains from about 30 to about 40 percent, by weight of a thermosetting resin, based on the weight of asbestos fibers.

References Cited

UNITED STATES PATENTS

| 1,465,389 | 8/1923 | Fisher | 161—211 |
| 2,584,959 | 2/1952 | Yocom et al. | 161—205 |
| 2,726,223 | 12/1955 | Talet | 161—205 |

REUBEN EPSTEIN, Primary Examiner

U.S. Cl. X.R.

156—276; 161—162, 205